July 8, 1947.  W. MORRIS  2,423,786
UNIVERSAL DRAFTING AND MEASURING INSTRUMENT
Filed July 25, 1944  2 Sheets-Sheet 1
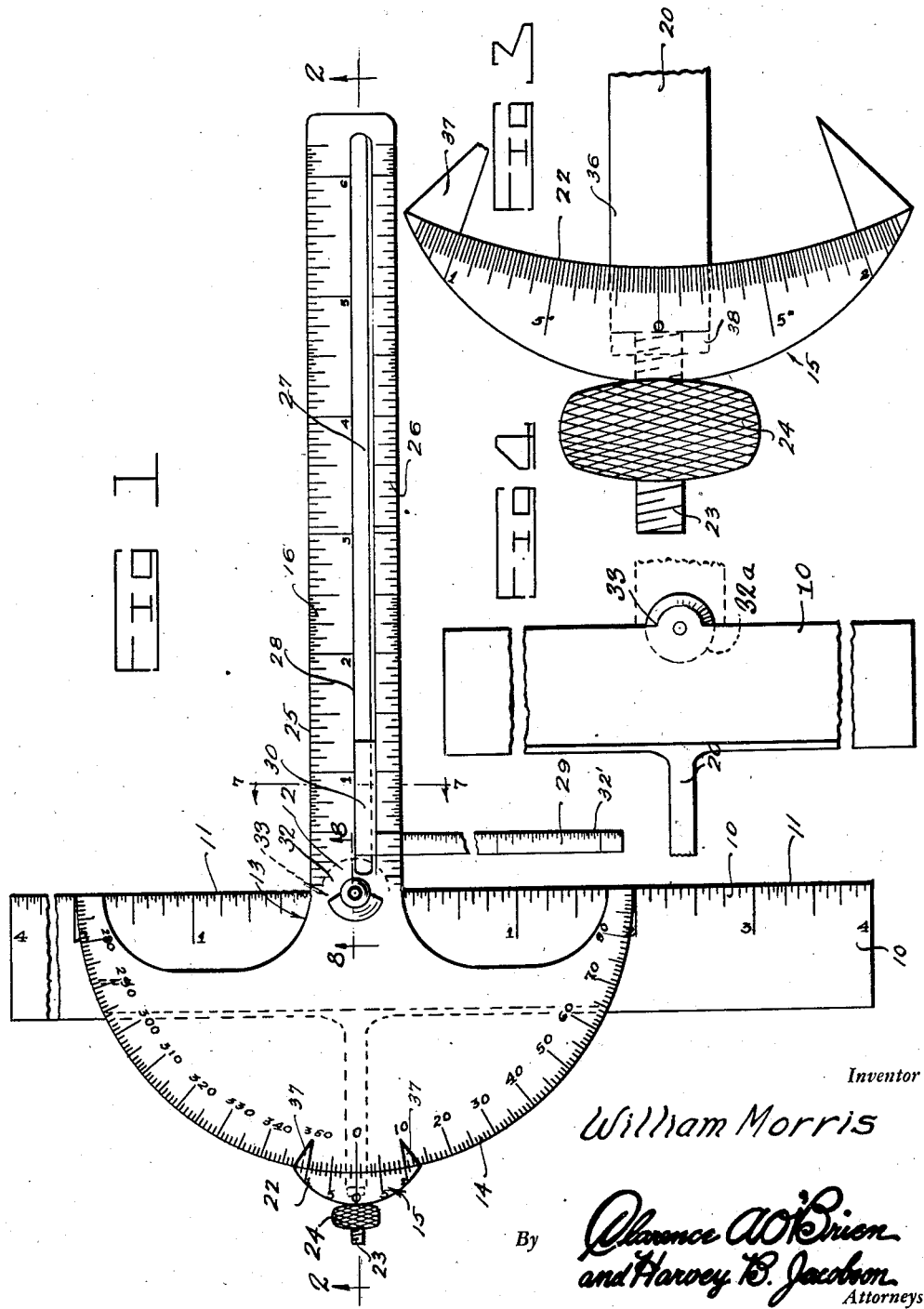
Inventor
*William Morris*
By *Clarence A. O'Brien
and Harvey B. Jacobson*
Attorneys July 8, 1947. W. MORRIS 2,423,786
UNIVERSAL DRAFTING AND MEASURING INSTRUMENT
Filed July 25, 1944 2 Sheets-Sheet 2
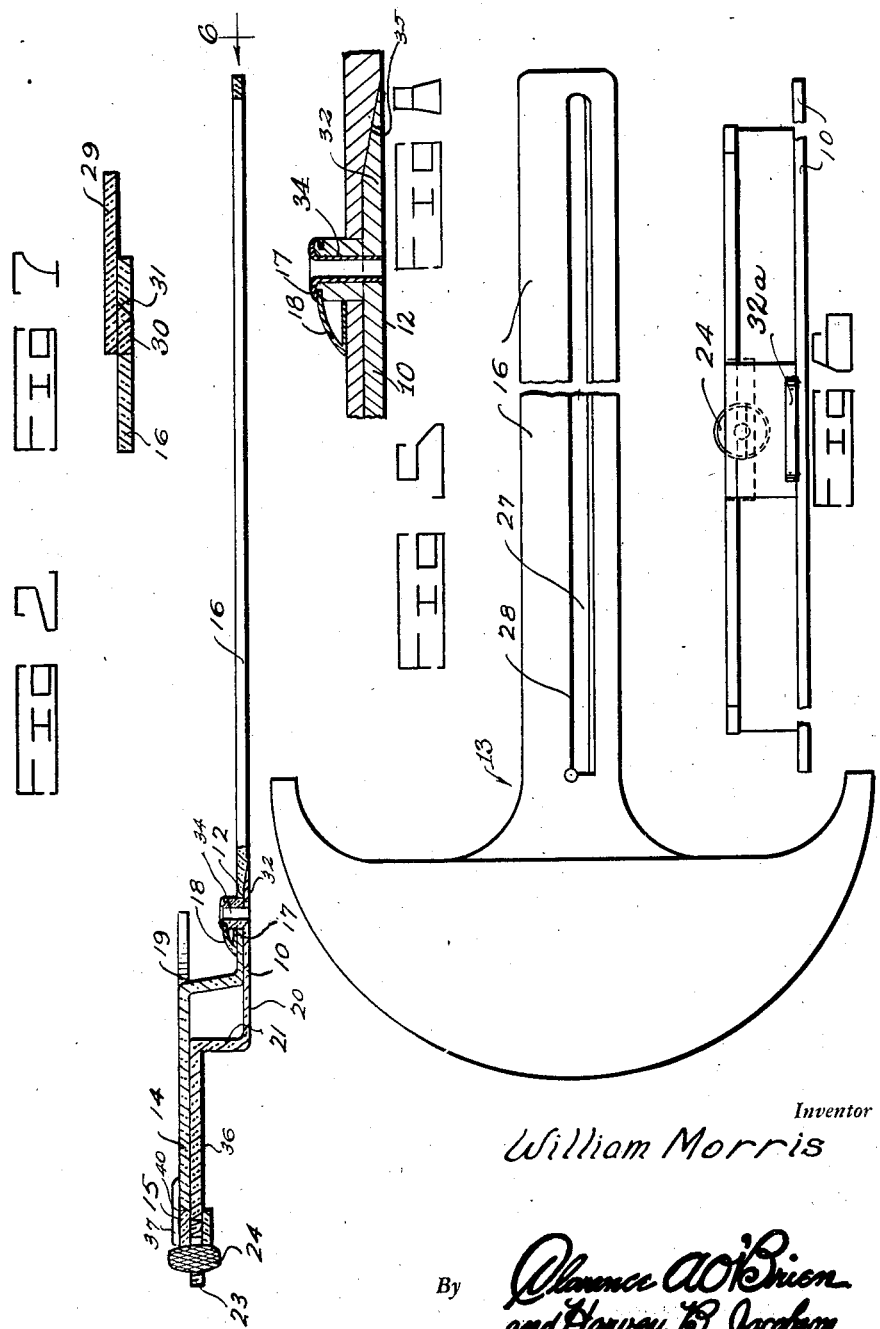
Inventor
William Morris
By Clarence A. O'Brien
and Harvey B. Jacobson
Attorneys Patented July 8, 1947

2,423,786

UNITED STATES PATENT OFFICE 2,423,786

UNIVERSAL DRAFTING AND MEASURING INSTRUMENT

William Morris, New Haven, Conn.

Application July 25, 1944, Serial No. 546,493

6 Claims. (Cl. 33—99)

This invention relates to drafting and measuring instruments and it has for its general object to provide a simple and effective universal drafting and measuring instrument combining the function of several precision drafting instruments such as a T-square, a protractor, a triangle and a ruler.

The invention essentially consists in a ruler blade to which a combined protractor and ruler is pivotally connected, which may be adjusted to any angular position. The protractor may be provided with a vernier permitting precision adjustment to the desired angle. These two main parts of the combined instrument are so connected according to the invention that the pivot is arranged at the intersection of the two ruler blades while the protractor with its vernier projects outwardly over the ruler to which it is pivotally secured.

The ruler blade which is fixed to the protractor may be provided with a slot, having one of its edges aligned with the center or fulcrum around which the protractor is rotated. This slot may form a slideway for an additional ruler blade by means of which lines parallel to those of the main or ruler blade may be drawn.

The combined instrument may be used with or without a T-square and it permits to draw all lines and to make all measurements for which the use of several drafting instruments is required.

Further features of the invention and further advantages of the same will be apparent from the following detailed description of two modifications of the invention shown in the accompanying drawings.

In the drawings:

Figure 1 is a plan view of the combined instrument showing the main parts thereof.

Figure 2 is a cross-section through the instrument along a transverse plane passing through the pivot and center of rotation of the protractor.

Figures 3 and 4 are plan views of the parts supporting the vernier and of the vernier itself, respectively, the latter figure showing the means for fixing the protractor in the desired position.

Figure 5 is a view of the combined protractor scale and ruler blade integral therewith.

Figure 6 is an end view of a modification of the instrument in the direction of the arrow 6 in Figure 2.

Figure 7 is an enlarged cross-section through the ruler attached to the protractor and through the additional ruler inserted in a longitudinal slot of the same.

Figure 8 is an elevational sectional view of a detail, the section being taken along line 8—8 of Figure 1.

Referring to the drawings, 10 designates the main ruler blade, one edge 11 of which is provided with the usual scale having 32 or more divisions to the inch and which is made of plastic, wood, metal, or other suitable material.

The drafting instrument may be so arranged that it is usable as a T square and in this case the main ruler blade may form the stock adapted to slide along the edge of the drafting board (Figure 8).

A member 13 comprising a protractor and a ruler blade 16 is rotatably mounted on said ruler blade, the axis of rotation 33 being located exactly in line with the edge 11 carrying the scale. To support the pivotal connection, the main ruler blade 10 is provided at this point with a semi-circular projecting hub portion 32 carrying a small cylindrical sleeve like upright 34. The edge of the hub portion is carefully bevelled at its circumference, at 35, Figure 8, and presents an outwardly inclined support for the member 13 whose underside is provided with a similarly prepared inclined or undercut surface which fits over the inclined hub portion 32. The underside of the ruler 16 thus lies flat on the surface of the drawing on which the main ruler 10 rests.

The pivotal connection between the two members 10 and 13 is obtained by means of the hollow rivet or nail bolt 34 whose head holds a spring member 18, preferably shaped as a segment whose underside lies flat on the surface of member 13. This member provides the necessary friction holding said member in its normal position and is compressed, if the member 13 is moved into one of the extreme positions.

The ends 33 of the undercut surface on ruler 16 and of the back portion 32 are preferably rounded.

When the combined drafting instrument is to be used as a T-square the ruler blade 10 may be used as the stock or alignment ledge, adapted to slide on the edge of the drafting board while the projecting hub, around which the member 13 turns, projects forwardly and upwardly, as shown at 32a in Figure 6 and in Figure 4 in dotted lines. The member 13 in this case moves in the level of the upper surface of member 10.

As seen from Figure 2, the scale of the protractor 14 is arranged at a higher level than the pivot connection, a stepped part 19 being inserted between that part which lies flush with the main ruler blade 10 and the scale of the protractor.

The main ruler blade 10 is provided with a stepped arm 20 projecting therefrom at a point opposite to but in alignment with the pivot connection. The stepped portion 21 is shaped in conformity with the stepped portion of the protractor scale, so that the surface of the protruding part 36 of arm 20 is in contact with the underside of the protractor scale member 14 and the two members are holding each other against displacement. This protruding portion 36 of arm 20 carries a vernier generally indicated by 15 which consists of a crescent shaped segment 22 with a central recess or pocket 38 of such a size that the protruding part 36 of arm 20 will exactly fit into it. At the two ends of the crescent shaped segment 22, two projecting wings 37 are arranged which are projecting upwardly and whose underside is therefore above the level of the segment 22. They therefore are able to grip the protractor scale member 14 and to slide at its upper surface.

The protruding portion 36 of arm 20 moreover carries a screw spindle 23 and a nut 27 provided with a milled or knurled outer surface which serves to press the vernier segment 22 against the outer edge of the protractor scale member 14 and to fix the member 13 in its position at the correct angle.

It is preferable that the outer edge 40 of the protractor scale be bevelled or outwardly inclined while the corresponding surface of the vernier segment 22 which is applied against it is undercut to secure a firm seat and to prevent lifting or loosening of the segment.

The ruler blade 16 attached to the protractor 14 is provided with scales 25 and 26 and with a slot 27 one edge 28 of which is in alignment with the center of the pivotal connection between the parts 10 and 13 which forms the fulcrum around which the combined protractor and ruler blade turn. This edge serves as a guide for drawing lines passing the center. The slot moreover serves as a slideway for an additional ruler blade 29 which is provided with a sliding head piece 30 entering the slot and which may be moved while remaining at right angle with respect to the ruler blade 16. When the protractor 16 is positioned as shown in the drawings, this ruler blade serves to draw lines which are parallel to those of the edges of the main ruler blade.

The slot is preferably provided with an inclined side face 31 on which an inclined face of the head piece 30 may rest.

The additional ruler 29 may be provided with graduations 32' on its upper face as well as on those faces located in the lines of sight of the draftsman.

The graduations of those sides of the main ruler blade 10 and of the ruler blade 16 which are facing each other are preferably made alike so that they may be used conjointly on lines which are in angular relation to each other.

When using the combined instrument for drawing angles the main ruler blade 10 is aligned with one leg of the angle while the second ruler blade attached to the protractor is turned around for the required number of degrees and is firmly adjusted using the vernier as a precision adjusting means. The nut 24 is then tightened on the spindle 23 so that the parts can no longer move. When lines corresponding to the legs of an angle have to be drawn the inner edge of the main ruler blade 10 and the edge 28 of the slot in the rotatable ruler blade provide the necessary guiding parts. The identical scales on both parts may be used for the angle if necessary.

From the above description it will be seen that the combined instrument reduces the number of drafting appliances which have to be used and saves time and labor while drafting by eliminating all premeasurements which are frequently necessary where separate rulers, triangles, T-squares and protractors are used. Moreover, the precision especially when drawing angles is much higher than that obtained with existing drafting appliances on account of the vernier arrangement.

The use of triangles is rendered unnecessary. The drafting instrument can be used with or without a T-square or instead of a T-square, the protractor is locked at the zero mark.

The above description of a modification of the invention will seem sufficient to persons skilled in the art and a more detailed specification is, therefore, regarded as unnecessary.

It is, however, manifest that many changes may be made and details may be modified without departing from the invention as the above specification is to be understood as illustrative but not as limitative as regards the scope of the invention.

Having described the invention, what is claimed as new is:

1. In a combined drafting instrument, a main ruler blade, forming a base, a pivot carried thereby a member comprising a second ruler blade and a protractor forming a unit, arranged at opposite sides of the pivot, the said protractor being arranged at a higher level than the ruler blade to which it is joined in a plane parallel thereto, a stepped portion between said pivot and said protractor, an arm extending from said first named main ruler rearwardly from said pivot beneath the protractor, a stepped portion on said extension arm and a flat portion, parallel to the ruler blades and in contact with the underside of the protractor and means on said extension for fixing the position of said protractor with respect to the main blade.

2. In a combined drafting instrument, a main ruler blade, forming a base, a pivot carried thereby a member mounted for rotation on said pivot, said member forming a unit comprising a second ruler blade and a protractor, and arranged at opposite sides of said pivot at substantially different levels, means for fixing the position of the protractor unit relatively to the main ruler blade, including a member, adapted to be pressed against the outer edge of the protractor, a screw and a manually operated nut, pressing against the aforesaid member, means for supporting said screw and nut at a level above the level of the blades, comprising an extension of the main ruler blade, arranged behind said pivot, including a stepped portion joining two flat portions, a stepped portion on the protractor carrying member between said pivot and said protractor, the stepped portions of both members being arranged to hold the upper surface of said flat portion and the underside of said protractor in contact with each other, the flat portion of the extension arm of the main ruler blade at the upper level screw pressed member provided with a recess for the said flat portion and having an upper portion arranged in the level of the protractor and adapted to be pressed against the latter.

3. In a combined drafting instrument, a main ruler blade forming a base, a member comprising a second ruler blade adapted to adopt various angular positions with respect to the main ruler blade, a means for pivotally connecting said two blades comprising a pivot member fixed on said main ruler blade provided with a head, a circular projection projecting from said main ruler blade, said second ruler blade being provided with a recess adapted to accommodate and to fit said circular projection and a spring member inserted between said pivot head and said movable member for holding the latter in permanent contact with the former.

4. In a combined drafting instrument, a main ruler blade, forming a base, a pivot carried thereby and a member mounted for angular movement on said pivot, said member comprising a second ruler blade and a protractor forming a unit, and arranged at opposite sides of the pivot, the said protractor being arranged at a higher level than the ruler blade to which it is joined in a plane parallel thereto, a stepped portion between said pivot and said protractor, an arm extending from said main ruler rearwardly from said pivot beneath the protractor, a stepped portion on said extension and a flat portion parallel to the main ruler blade and in contact with the underside of the protractor, a pivot head on the pivot carried by said main ruler blade, a circular projection projecting from said main ruler blade, said second ruler blade being provided with a decess adapted to accommodate said projection, a spring member inserted between said pivot head and said movable member for holding the latter in permanent contact with the former and means on said extension arm of the main ruler blade for fixing the position of said protractor with respect to the main ruler blade.

5. A combined drafting instrument as specified in claim 4, wherein the lower surface of the main ruler blade and the lower surface of the second ruler blade are arranged in the same plane when the latter occupies a position at right angle to the former.

6. In a combined drafting instrument as specified in claim 2 wherein the screw pressed member applied against said outer protractor edge consists of a luniform segment carrying a vernier having upturned wings sliding on the surface of the protractor.

WILLIAM MORRIS.

REFERENCES CITED

The following references are of record in the file of this patent:

UNITED STATES PATENTS

| Number | Name | Date |
|---|---|---|
| 58,056 | Bronson | Sept. 18, 1866 |
| 227,844 | Salot | May 18, 1880 |
| 1,045,695 | Goldwater | Nov. 26, 1912 |
| 1,773,809 | Elder | Aug. 26, 1930 |
| 714,404 | Schaller | Nov. 25, 1902 |